(12) United States Patent
Sayama

(10) Patent No.: US 7,984,945 B2
(45) Date of Patent: Jul. 26, 2011

(54) REDUCED THICKNESS VEHICLE SEAT WITH ACTIVE HEADREST

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 15 days.

(21) Appl. No.: 12/495,882

(22) Filed: Jul. 1, 2009

(65) Prior Publication Data

US 2010/0001562 A1    Jan. 7, 2010

(30) Foreign Application Priority Data

Jul. 4, 2008  (JP) .................................. 2008-175752

(51) Int. Cl.
*B60N 2/42*   (2006.01)

(52) U.S. Cl. .............................. 297/216.12; 297/216.13

(58) Field of Classification Search .............. 297/216.13, 297/216.12, 452.18
See application file for complete search history.

(56) References Cited

U.S. PATENT DOCUMENTS

| | | | |
|---|---|---|---|
| 1,684,062 A * | 9/1928 | Eberle et al. ............. | 297/452.29 |
| 6,550,865 B2 * | 4/2003 | Cho ............................. | 297/408 |
| 7,077,472 B2 * | 7/2006 | Steffens, Jr. ............ | 297/216.13 |
| 2004/0070240 A1 * | 4/2004 | Håland et al. ............ | 297/216.12 |
| 2010/0007183 A1 * | 1/2010 | Akutsu .................... | 297/216.12 |

FOREIGN PATENT DOCUMENTS

JP        2006-182094 A    7/2006

\* cited by examiner

*Primary Examiner* — Milton Nelson, Jr.
(74) *Attorney, Agent, or Firm* — Drinker Biddle & Reath LLP

(57) ABSTRACT

A reduced thickness vehicle seat is provided with an active headrest, including a transmission assembly for transmitting a load received by a pressure receiving part to the headrest side, and a mechanism for moving the headrest when a rear end collision occurs. The transmission assembly has a lower link movably installed in the lower part of the seat back frame of the vehicle seat and connected to the pressure receiving part; an upper link disposed in the upper part of the seat back frame and movably connected with the headrest; and a connecting link connecting the lower link and the upper link to each other and operating in association with the operation of the lower link. The connecting link has a bent part bent along the lengthwise direction in the direction to separate from the backrest surface of the seat back.

2 Claims, 8 Drawing Sheets

REDUCED THICKNESS VEHICLE SEAT WITH ACTIVE HEADREST

BACKGROUND

The present invention relates to a vehicle seat and, more particularly, to a vehicle seat having a mechanism for moving a headrest when a rear end collision occurs.

When a motor vehicle undergoes a collision from the vehicle rear side, that is, when an rear end collision occurs, the head of a passenger seated on a vehicle seat is moved suddenly to the rear by inertia, so that the neck and other parts of the passenger may undergo a shock. Conventionally, therefore, a known vehicle seat has a configuration for supporting the passenger's head and easing a shock by moving a headrest forward when a rear end collision occurs in order to protect the passenger's head, neck, and other parts from the shock at the rear end collision time, as is disclosed, e.g., in Japanese Unexamined Patent Application Publication No. 2006-182094 ("the '094 Publication").

The vehicle seat described in the '094 Publication is configured so that a plate body is installed to a seat back frame so as to be movable back and forth; a headrest is installed to the upper part of the seat back frame so as to be movable back and forth by an upper link; a lower link is installed to the lower part of the seat back frame so as to be turnable; and the lower link and the upper link are connected to each other by a transmission member (connecting link). With this design, a load sensed by the plate body when a rear end collision occurs is transmitted to the upper-side link to move the headrest forward.

For the vehicle seat described in the '094 Publication, a load at the time when the passenger is moved rearward by the rear end collision is received at the vicinity of the waist at which the rearward displacement is larger than at the back, so that the rear end collision can be sensed with certainty. Also, by the configuration such that a load received by the plate body is transmitted to the upper link via the lower link and the transmission member (connecting link), the load can be transmitted to the upper link with high transmission efficiency, so that the operation of forward movement of the headrest is reliable.

However, for the vehicle seat described in the '094 Publication described above, as shown in the transverse sectional view of FIG. 8, there is a portion in which a connecting link 140 for connecting the lower link and the upper link to each other is arranged so as to project significantly to the backrest surface side from a side frame 121. Therefore, if the vehicle seat is manufactured as a thin type, the thickness t2 of a cushion material 104 of a portion arranged on the backrest surface side of the side frame 121 decreases, which presents a problem in that it is difficult to keep the seating comfortable.

SUMMARY

Accordingly, an object of the present invention is to provide a vehicle seat in which a rearward movement load of the passenger is detected with certainty when a rear end collision occurs, and the headrest is moved forward, whereby the passenger's head can be supported, and also the thickness of the vehicle seat can further be decreased while keeping the seating comfortable.

To achieve the above object, various embodiments of the present invention provide a vehicle seat having a seat back provided with a mechanism for moving a headrest when a rear end collision occurs, wherein the seat back includes a cushion material disposed on the backrest surface side; a pressure receiving part for receiving a load of rearward movement of a passenger; and a transmission assembly for transmitting the load received by the pressure receiving part to the headrest side, the transmission assembly is configured so as to have a lower link that is movably installed in the lower part of the seat back and is connected to the pressure receiving part; an upper link that is disposed in the upper part of the seat back and is movably connected with the headrest; and a connecting link that connects the lower link and the upper link to each other and is operated in association with the operation of the lower link, and the connecting link has a bent part bent along the lengthwise direction in the direction such as to separate from the backrest surface of the seat back.

As described above, according to the vehicle seat in accordance with various embodiments of the present invention, the transmission assembly is configured so as to have the connecting link that connects the lower link and the upper link to each other and is operated in association with the operation of the lower link, and the connecting link has a bent part bent along the lengthwise direction in the direction such as to separate from the backrest surface of the seat back. Therefore, the thickness of the cushion material can be secured without impairing the function of protecting the passenger's head by moving the headrest forward when a rear end collision occurs, and thereby the seating comfort can be improved. Also, since the thickness of the cushion material can be secured even in a limited space, the thickness of the vehicle seat can be decreased further, and accordingly the degree of freedom of layout and design can be improved.

In various embodiments of the present invention, preferably, the connecting link includes an upper connection part connected to the upper link; a lower connection part connected to the lower link; and a connecting part for connecting the upper connection part and the lower connection part to each other, and the bent part is formed in the connecting part.

Since the bent part is formed in the connecting part, the thickness of the cushion material in a portion affecting the seating comfort can be secured. Therefore, the seating comfort can be improved without impairing the function of holding and protecting the passenger's head by moving the headrest forward when a rear end collision occurs.

According to the vehicle seat in accordance with various embodiments of the present invention, the thickness of the cushion material can be secured without impairing the function of protecting the passenger's head by moving the headrest forward when a rear end collision occurs, and thereby the seating comfort can be improved. Also, since the thickness of the cushion material can be secured even in a limited space, the thickness of the vehicle seat can be decreased further, and accordingly the degree of freedom of layout and design can be improved.

BRIEF DESCRIPTION OF THE DRAWINGS

The invention is described in more detail below with reference to various embodiments of the invention illustrated in the drawing figures.

DETAILED DESCRIPTION OF THE PREFERRED EMBODIMENTS

One embodiment of the present invention will now be described with reference to the accompanying drawings. The members, arrangement, and the like described below do not restrict the present invention, and can be changed in various ways without departing from the spirit and scope of the present invention.

Figure 1:
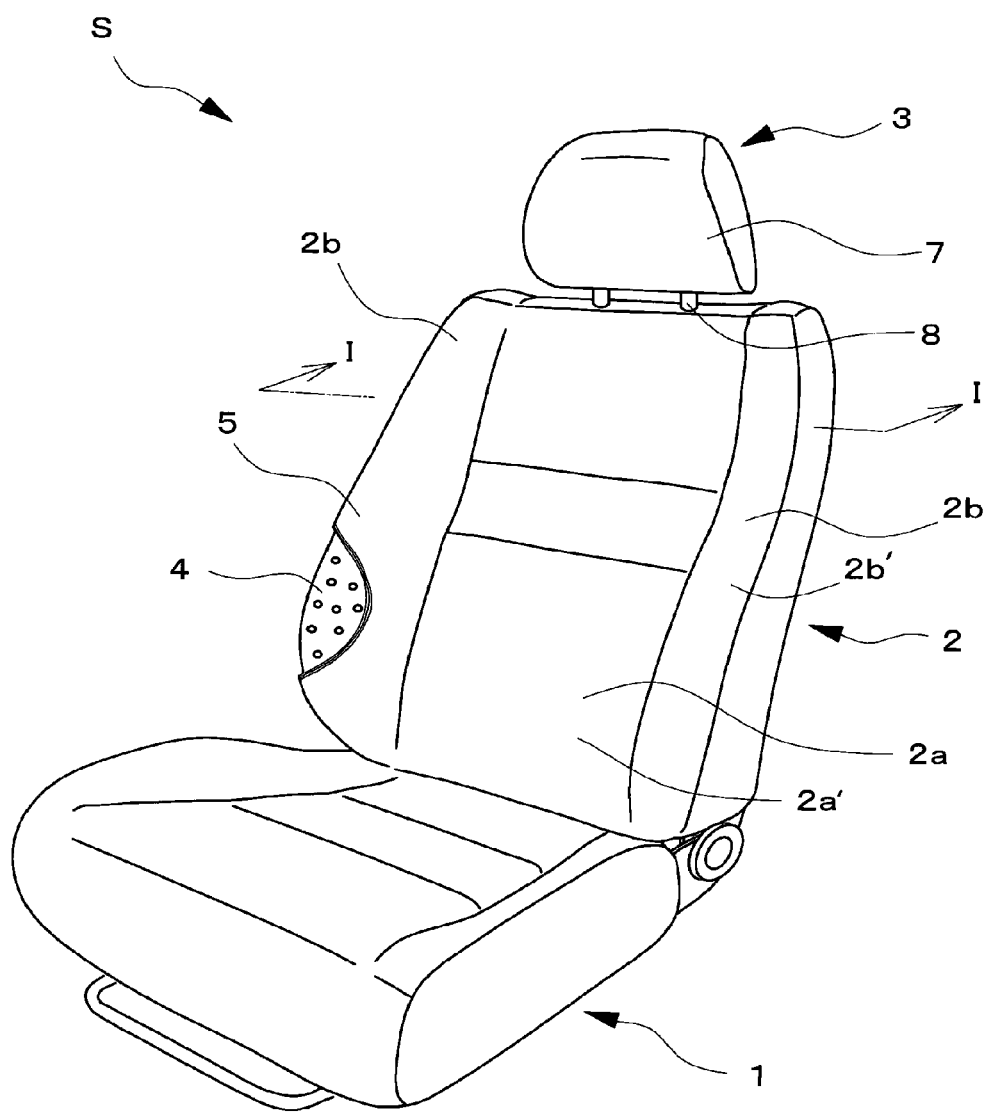
FIG. 1 is a perspective view of a vehicle seat.

As shown in FIG. 1, a vehicle seat S of this embodiment includes a seating part 1, a seat back 2, and a headrest 3 installed in the upper part of the seat back 2. The seating part 1 and the seat back 2 are formed by installing a cushion material 4 to a seat back frame 20 (refer to FIG. 2) and by covering the outer periphery of the cushion material 4 with a cover material 5. The seat back 2 of this embodiment has a backrest part 2a, with a backrest front surface 2a', for supporting the passenger's back, and side support parts 2b, with respective side support front surfaces 2b', that are formed so as to be continuous from the right and left of the backrest part 2a and rise forward to support the right and left sides of the passenger's upper body. The configuration of the headrest 3 is optional, and at least includes a head support part 7 for supporting the passenger's head and pillars 8 for mounting the head support part 7 to the seat back 2.

Figure 2:
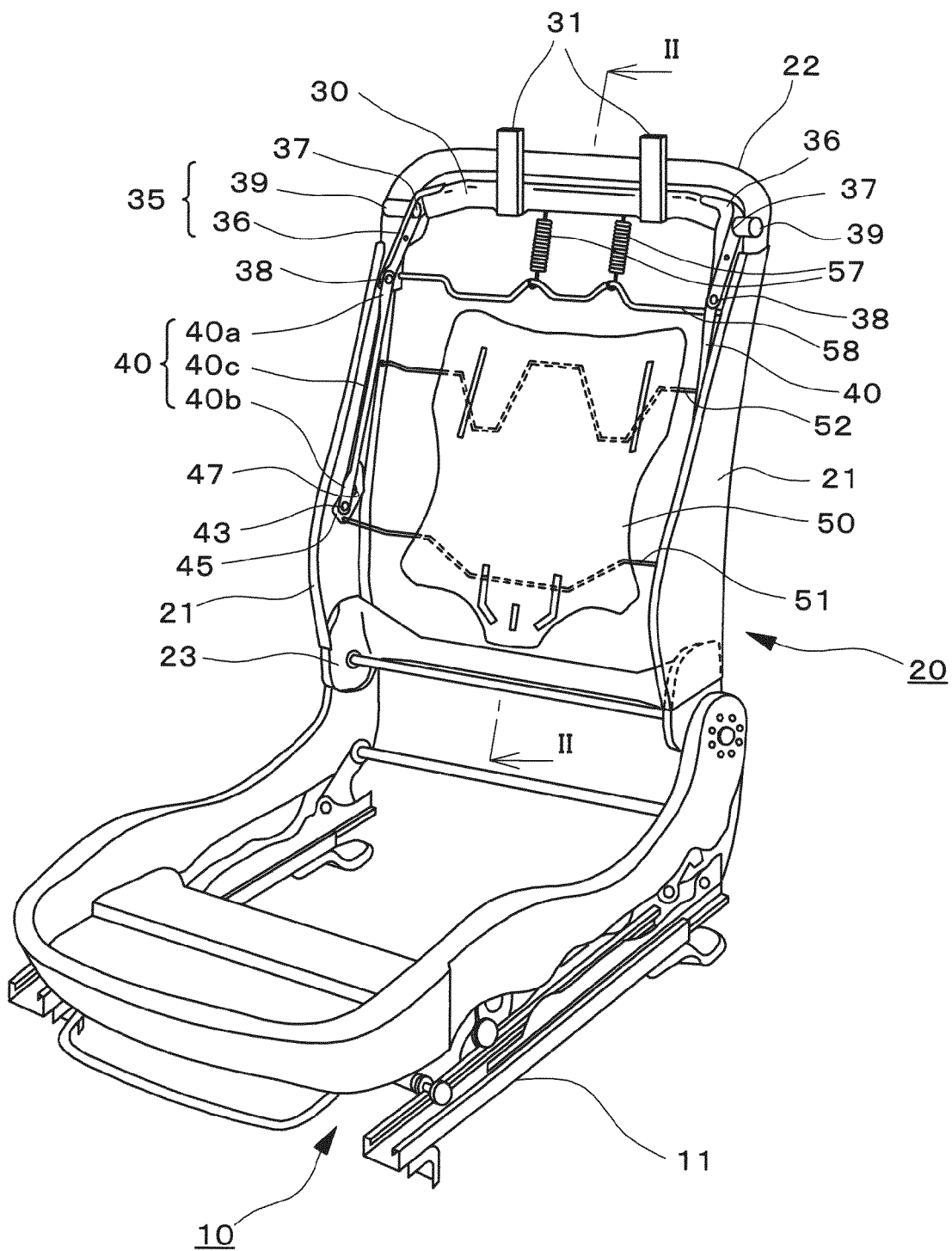
FIG. 2 is a perspective view of frames for a vehicle seat.

As shown in FIG. 2, a frame for the vehicle seat S of this embodiment includes a seating frame 10 forming the seating part 1, the seat back frame 20 forming the seat back 2, and a base frame 11 for connecting the vehicle seat S to a vehicle body floor (not shown). The seat back frame 20 has a pair of side frames 21 that are disposed in a spaced manner at the right and left and each have a predetermined length in the up and down direction, an upper frame 22 that connects the upper end parts of the side frames 21 to each other, and a lower frame 23 that connects the lower end parts of the side frames 21.

In the vicinity of the upper frame 22 on the inside of the seat back frame 20, a headrest mounting rod 30 extending transversely for holding the headrest 3 is disposed. The pillars 8 of the headrest 3 are inserted through two pillar support members 31 provided on the headrest mounting rod 30, and are installed so that the height can be adjusted. The configuration of the pillars 8 and the pillar support members 31 is publicly known, and the pillar 8 is held by engaging an engagement member provided on the pillar support member 31 with an engagement concave part, not shown, formed in the pillar 8.

Also, one end of a plate-shaped link bracket 36 is fixed to both ends of the headrest mounting rod 30 by welding or the like, and the link bracket 36 is turnably connected to one end of a rotation support member 39 via a shaft 37 on the seat back frame 20 side. The rotation support part 39 of this embodiment is welded to the vicinity of a connecting part between the upper frame 22 and the side frame 21. The link bracket 36 and the rotation support member 39 constitute an upper link 35 in this embodiment.

Thus, the headrest mounting rod 30 is turnably installed to the seat back frame 20 by the shaft 37 via the link bracket 36 and the rotation support member 39. That is to say, in the state in which the headrest 3 is attached to the headrest mounting rod 30, the headrest 3 is turned with respect to the seat back frame 20 by the shaft 37.

The headrest 3 forms an active headrest mechanism that moves forward with respect to the seat back 2 to positively support the passenger's head when the vehicle undergoes a shock from the rear and the passenger is moved rearward. The forward movement of the headrest 3 is accomplished by the link mechanism serving as a transmission assembly. This link mechanism is formed by the upper link 35, a lower link 45, and a connecting link 40 that connects the upper link 35 and the lower link 45 to each other. The operation of the link mechanism is described below.

The link bracket 36 extends downward from a connecting part with the headrest mounting rod 30, and to the end part on the opposite side to the headrest mounting rod 30, an upper connection part 40a of the connecting link 40 is turnably fixed via a shaft 38.

Figure 3:
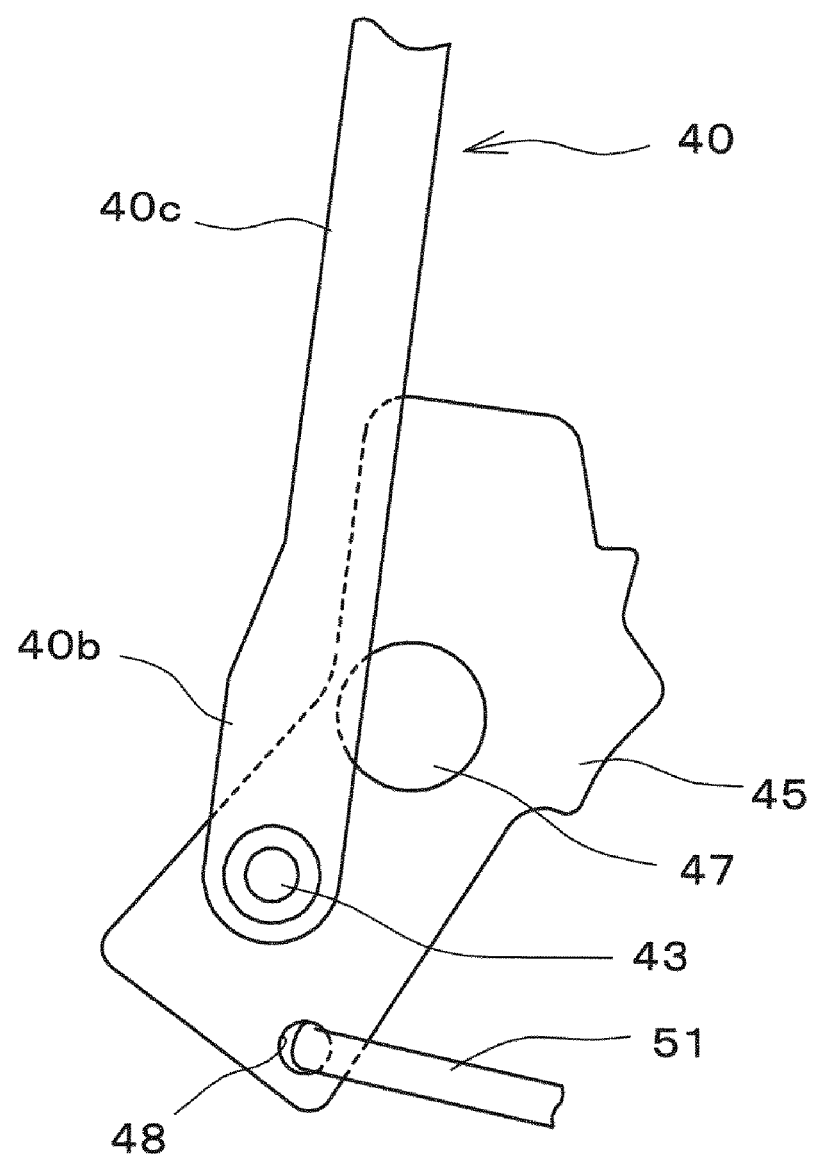
FIG. 3 is a side view of a lower link.

The lower link 45 is a substantially L-shaped plate-like member, and is turnably fixed to the inside surface of the side frame 21 by a shaft 47 (refer to FIG. 3). Also, a wire locking hole 48 is formed under a shaft 43 of the lower link 45, and one end of a wire spring 51 is inserted through the wire locking hole 48. The wire spring 51 is locked to the wire locking hole 48 by bending the end part of the wire spring 51.

Also, in the central part of the seat back frame 20, a plate-shaped support 50 serving as a pressure receiving part is disposed. The plate-shaped support 50 is a plate-shaped member for supporting the passenger's back, and has a function of supporting the passenger's back by a surface to stabilize the seating posture when the passenger is seated normally, and of operating the link mechanism by the rearward movement caused by pressing due to the rearward movement of the passenger when the vehicle undergoes a collision from the rear.

The pressure receiving part (plate-shaped support) 50 is installed to the right and left seat back frames 20 via two wire springs 51 and 52, which are provided in parallel with each other in the upper and lower parts, so as to be movable back and forth. The wire spring 52 disposed in the upper part is installed to the seat back frame 20, and the wire spring 51 disposed in the lower part is installed to the seat back frame 20 via the lower link 45 by being locked to the wire locking hole 48 in the lower link 45 as described above.

The pressure receiving part 50 of this embodiment is formed of a synthetic resin such as polypropylene having a strength of a degree such as to be capable of supporting the passenger, and is configured so as to support the passenger while elastically deforming to some extent when being subjected to a rearward load from the passenger. Also, the wire springs 51 and 52 of this embodiment each have a predetermined elasticity, and are configured so as to extend to some extent to allow the pressure receiving part 50 to move rearward when a load is applied to the pressure receiving part 50. As such wire springs 51 and 52, a zigzag spring, a formed wire spring, or the like can be used.

Above the pressure receiving part 50, a spring supporting wire 58 extending transversely is disposed so that both ends thereof are fixed to the side frames 21, and between the headrest mounting rod 30 and the spring supporting wire 58, two return springs 57 are disposed in a spaced manner in parallel with each other. The return springs 57 urge the headrest mounting rod 30 to the rear so as to erect the headrest 3 excluding the time when the vehicle undergoes a rear end collision.

The connecting link 40 is a member extending in the up and down direction, and is formed by the upper connection part 40a connected to the lower end part of the link bracket 36, a lower connection part 40b connected to the lower link 45, and a connecting part 40c for connecting the upper connection part 40a and the lower connection part 40b to each other. As shown in FIGS. 2 and 3, the lower connection part 40b is turnably connected to the front lower corner part of the lower link 45 by the shaft 43. In this manner, the connecting link 40 connects the lower link 45 and the upper link 35 to each other.

Figure 4:
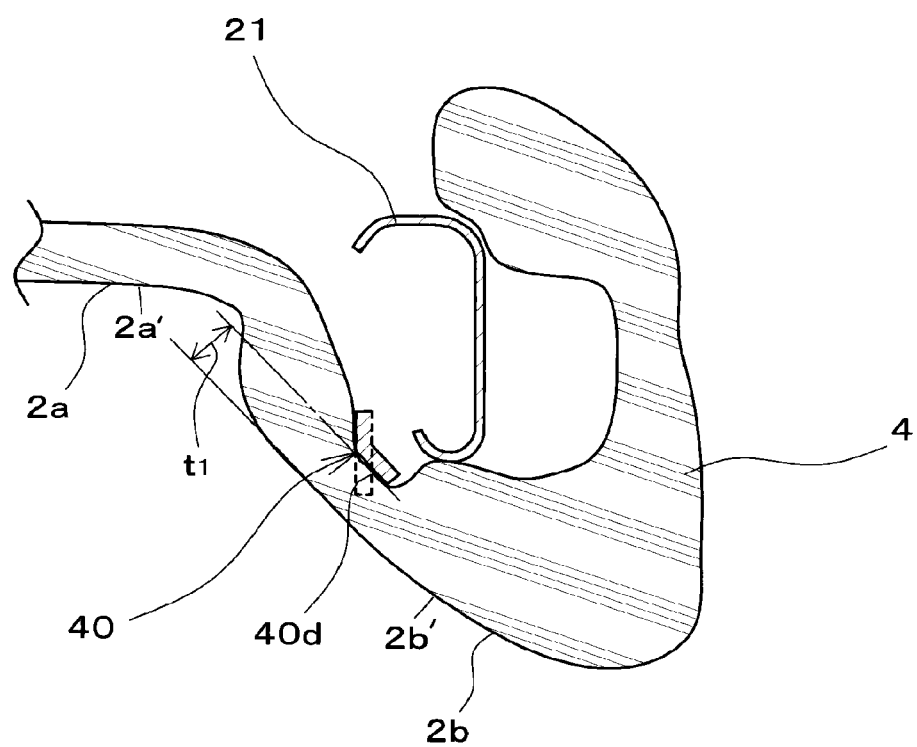
FIG. 4 is a partially transverse sectional view taken along the line I-I of FIG. 1.
Figure 5:
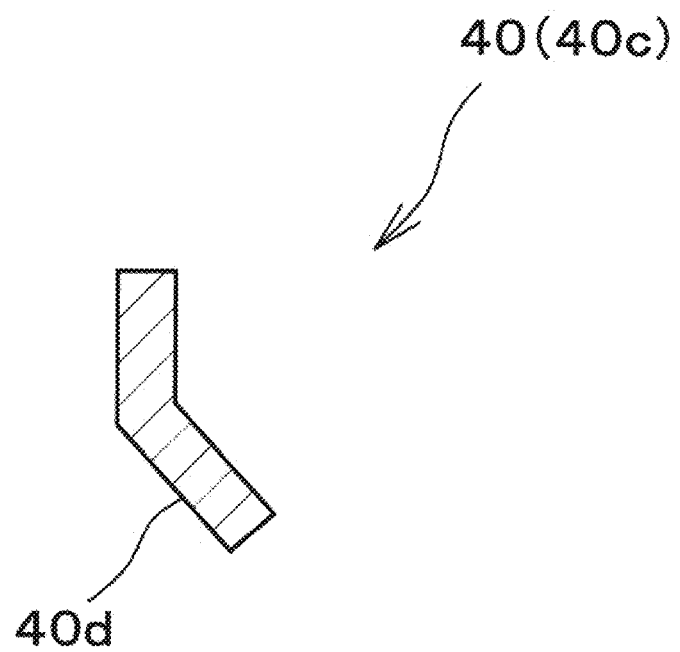
FIG. 5 is a transverse sectional view of a bent part of a connecting link.

FIG. 4 is a partially transverse sectional view taken along the line I-I of FIG. 1, and FIG. 5 is a transverse sectional view of a bent part 40d of the connecting link 40 of this embodiment. In FIG. 4, the cover material 5 is omitted.

In the connecting part 40c of the connecting link 40 of this embodiment, there is foamed a bent part 40d in which a portion close to the backrest front surface 2a' of the connecting link 40 is bent along the lengthwise direction in the direction such as to separate from the backrest front surface 2a' or side support front surface 2b' of the seat back 2. The bent part 40d is formed by this bending operation, by which the distance between the connecting part 40c of the connecting link 40 and the backrest surface can be increased while a decrease in strength is prevented.

Figure 8:
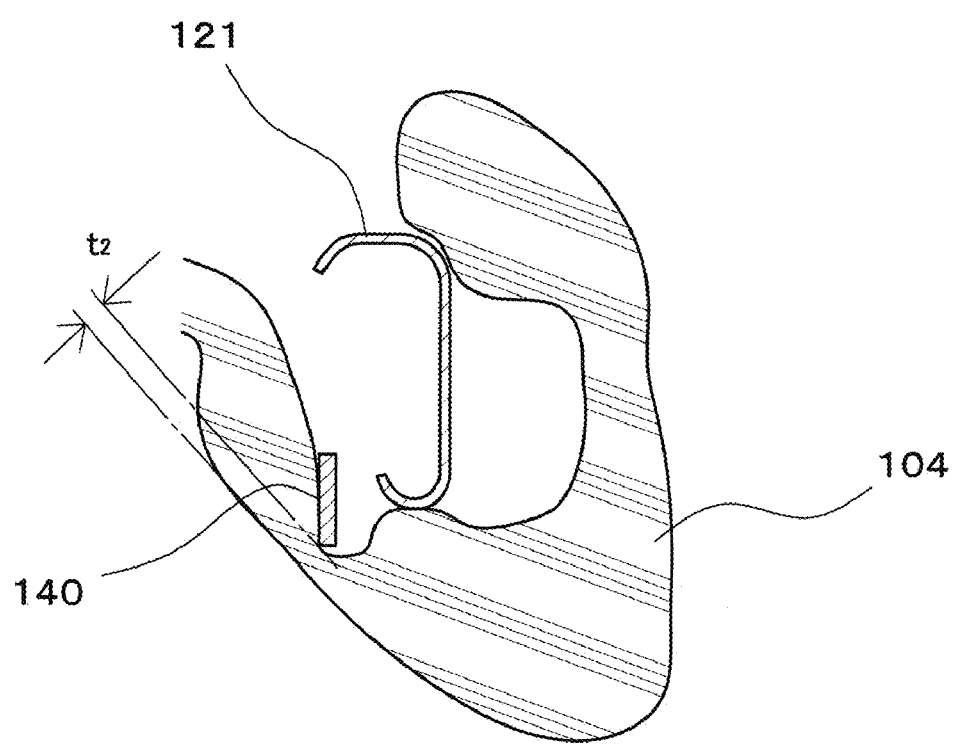
FIG. 8 is a partially transverse sectional view of a conventional seat back.

That is to say, as shown in FIG. 4, the connecting link 40 is formed so as to be bent from the state indicated by a broken line and to have the bent part 40d indicated by a solid line. Therefore, the thickness t1 of the cushion material 4 of a portion arranged on the backrest front surface side 2a' or side support front surface 2b' of the side frame 21 becomes larger than the thickness t2 shown in FIG. 8, so that comfortable seating can be kept. The backrest surface in this embodiment denotes the whole of front surface in the width direction of the seat back 2 shown in FIG. 1, and includes the front surfaces of the backrest part 2a and the side support parts 2b.

Next, the operation of the vehicle seat S at the rear end collision time is explained with reference to FIG. 6.

Figure 6:
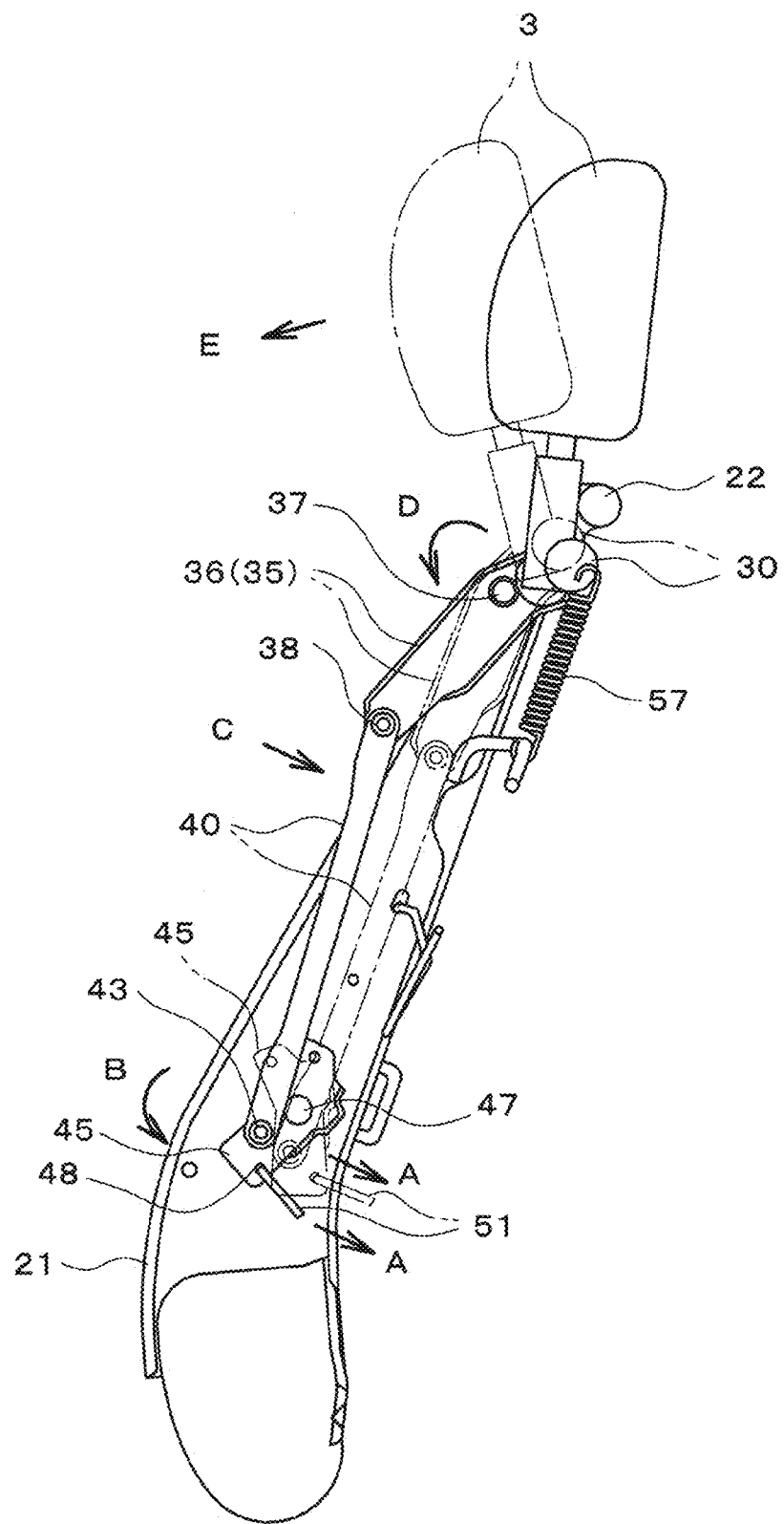
FIG. 6 is a side view for illustrating the operation of a link mechanism at the rear end collision time.

FIG. 6 is a side view for explaining the operation of the link mechanism, being a sectional view taken along the line II-II of FIG. 2. When the vehicle undergoes a collision from the rear, and the load of the passenger moves rearward and the load having a predetermined or larger amount is applied to the plate-shaped support 50 via the cushion material 4, the plate-shaped support 50 and the wire spring 51 are moved rearward (in the direction indicated by the arrow A in FIG. 6). When the wire spring 51 is moved in the direction indicated by the arrow A in FIG. 6, the lower link 45 is turned around the shaft 47 in the direction indicated by the arrow B in FIG. 6.

When the lower link 45 is turned, the shaft 43 connecting the lower link 45 and the connecting link 40 to each other is moved rearward, and the connecting link 40 is moved rearward, that is, in the direction indicated by the arrow C in FIG. 6. Then, the lower side of the link bracket 36 connected to the upper side of the connecting link 40 is turned rearward, and the link bracket 36 is turned around the shaft 37 in the direction indicated by the arrow D in FIG. 6. Thereby, the headrest mounting rod 30 connected to the upper side of the link bracket 36 is moved in the direction indicated by the arrow E in FIG. 6, that is, to the front, and therefore the headrest 3 is moved forward.

Thus, the configuration is made such that when the vehicle undergoes a rear end collision, the link mechanism is operated by the load received by the pressure receiving part 50, and the headrest 3 is moved forward, by which the passenger's head is supported.

For the connecting link 40 in the above-described embodiment, since the distance between the connecting part 40c and the backrest surface increases, the thickness t1 of the cushion material 4 disposed in this portion can be secured, so that the seating comfort can be improved as compared with the conventional art.

Also, even in the case where the vehicle seat S is manufactured so as to be thinner than the conventional vehicle seat, the thickness of the cushion material 4 can be secured, and accordingly the degree of freedom of layout and design can be improved.

Since the thickness of the cushion material 4 can be increased by forming the bent part 40d, when a rear end collision occurs, the passenger is allowed to sink back into the seat back more deeply. Therefore, the load received by the pressure receiving part 50 increases, and the rearward load movement of the passenger at the rear end collision time is detected more reliably, so that the passenger's head can be supported by moving the headrest 3 forward. Further, the load received by the cushion material 4 in a portion arranged on the backrest surface side of the connecting link 40 is distributed, so that the durability of the cushion material 4 is improved.

Figure 7A:
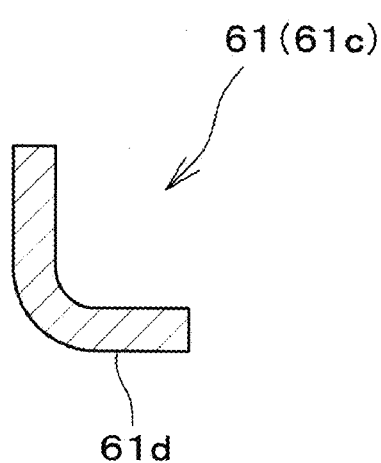
FIGS. 7A-C are transverse sectional views of bent parts of a connecting link in accordance with other embodiments.
Figure 7B:
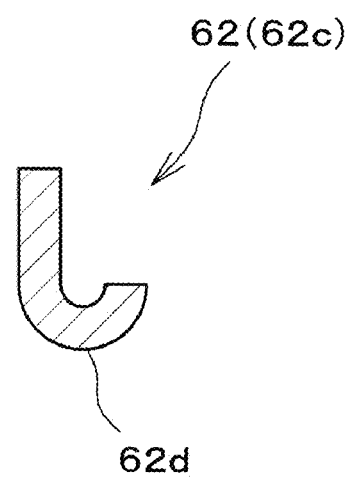
Figure 7C:
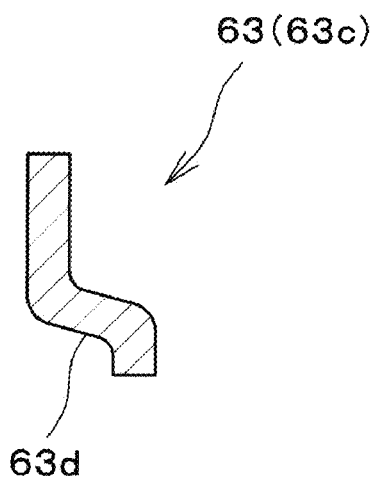

Furthermore, the bent part 40d of the connecting link 40 can be formed into shapes shown in FIGS. 7A to 7C.

FIGS. 7A to 7C are transverse sectional views showing bent parts 61d, 62d and 63d of connecting links 61, 62 and 63 in accordance with other embodiments.

FIG. 7A shows an example in which the bent part 61d is formed by bending the connecting link 61 substantially into an L-shape along the lengthwise direction in the direction such that the connecting link 61 separates from the backrest surface. Similarly, FIG. 7B shows an example in which the bent part 62d is formed by bending the connecting link 62 substantially into a semicircular shape, and FIG. 7C shows an example in which the bent part 63d is formed by bending the connecting link 63 a plurality of times.

The transverse cross-sectional shapes of the bent parts 61d, 62d and 63d can accomplish the same function as that of the connecting link 40 by bending the connecting links 61, 62 and 63 in the direction such that these connecting links separate from the backrest surface.

As described above, according to the vehicle seat S in accordance with embodiments of the present invention, the bent part 40d, 61d, 62d, 63d is provided in the connecting part of the connecting link 40, 61, 62, 63, and thereby the distance between the connecting part 40c, 61c, 62c, 63c and the backrest surface is increased. Therefore, the thickness t1 of the cushion material 4 can be secured without impairing the function of protecting the passenger's head by moving the headrest 3 forward when a rear end collision occurs, and thereby the seating comfort can be improved. Also, since the thickness of the cushion material 4 can be secured even in a limited space, the thickness of the vehicle seat can be decreased further, and accordingly the degree of freedom of layout and design can be improved.

Also, since the bent part 40d, 61d, 62d, 63d is formed in the connecting part 40c, 61c, 62c, 63c, the thickness t1 of the cushion material 4 in a portion affecting the seating feeling can be secured. Thereby, the seating feeling can be improved without impairing the function of holding and protecting the passenger's head by moving the headrest 3 forward when a rear end collision occurs.

In the case where the cushion material 4 is formed so as to be thick, when a rear end collision occurs, the passenger is allowed to sink back into the seat back 2 more deeply. Therefore, the load received by the pressure receiving part 50 increases, and the rearward load movement of the passenger at the rear end collision time is detected more reliably, so that the passenger's head can be supported by moving the headrest 3 forward. Further, the load received by the cushion material 4 in a portion arranged on the backrest surface side of the connecting link 40 is distributed, so that the durability of the cushion material 4 can be improved.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A vehicle seat having a seat back provided with a mechanism for moving a headrest when a rear end collision occurs, wherein the seat back comprises:
   a cushion material disposed at a front side of a frame of the seat back;
   a pressure receiving part for receiving a load of rearward movement of a passenger; and
   a transmission assembly for transmitting the load received by the pressure receiving part to a headrest side, the transmission assembly comprising:
   a lower link which is movably installed in a lower part of the seat back and is connected to the pressure receiving part;
   an upper link which is connected to an upper part of the seat back frame to accommodate movement of a headrest; and
   a connecting link which connects the lower link and the upper link to each other and is operated in association with the operation of the lower link, the connecting link comprising a main body that extends generally parallel to a front-to-rear direction in a cross section and a bent part that is bent from the main body along a lengthwise direction in a direction away from at least one of the backrest front surface and a side support front surface in a cross section, and the bent part is formed along a lengthwise direction of the connecting link.

2. The vehicle seat according to claim 1, wherein the connecting link comprises:
   an upper connection part connected to the upper link;
   a lower connection part connected to the lower link; and
   a connecting part for connecting the upper connection part and the lower connection part to each other; and
   wherein the bent part is formed in the connecting part.

* * * * *